(12) United States Patent
Selvaggi et al.

(10) Patent No.: US 11,211,064 B2
(45) Date of Patent: Dec. 28, 2021

(54) USING A VIRTUAL ASSISTANT TO STORE A PERSONAL VOICE MEMO AND TO OBTAIN A RESPONSE BASED ON A STORED PERSONAL VOICE MEMO THAT IS RETRIEVED ACCORDING TO A RECEIVED QUERY

(71) Applicant: SoundHound, Inc., Santa Clara, CA (US)

(72) Inventors: Mara Selvaggi, Santa Clara, CA (US); Irina A Spiridonova, Campbell, CA (US); Karl Stahl, Menlo Park, CA (US)

(73) Assignee: SoundHound, Inc., Santa Clara, CA (US)

( * ) Notice: Subject to any disclaimer, the term of this patent is extended or adjusted under 35 U.S.C. 154(b) by 55 days.

(21) Appl. No.: 16/255,674

(22) Filed: Jan. 23, 2019

(65) Prior Publication Data
US 2020/0234698 A1 Jul. 23, 2020

(51) Int. Cl.
*G10L 15/22* (2006.01)
*G10L 15/18* (2013.01)
*G10L 15/30* (2013.01)
*G10L 15/19* (2013.01)
*G10L 15/08* (2006.01)

(52) U.S. Cl.
CPC .......... *G10L 15/22* (2013.01); *G10L 15/1815* (2013.01); *G10L 15/1822* (2013.01); *G10L 15/19* (2013.01); *G10L 15/30* (2013.01); *G10L 2015/088* (2013.01); *G10L 2015/223* (2013.01)

(58) Field of Classification Search
CPC ...... G10L 15/19; G10L 15/22; G10L 15/1815
See application file for complete search history.

(56) References Cited

U.S. PATENT DOCUMENTS

| 6,675,159 B1 | 1/2004 | Lin et al. |
| 2006/0064411 A1 | 3/2006 | Gross et al. |
| 2013/0268260 A1* | 10/2013 | Lundberg ................ G06F 40/40 704/8 |

(Continued)

OTHER PUBLICATIONS

Cardona et al., "Ask Your (Virtual) Assistant to Take Notes for You", download Nov. 28, 2018 from community.cengage.com/t5/Cool-Tech-Tools-Blog/Ask-Your-Virtual-Assistant-to-Take-Notes-for-You/ba-p/5002, Dec. 2017, (3 pages).

(Continued)

*Primary Examiner* — Michael N Opsasnick
(74) *Attorney, Agent, or Firm* — Haynes Beffel & Wolfeld LLP; Andrew Dunlap

(57) ABSTRACT

The technology disclosed relates to retrieving a personal memo from a database. The method includes receiving, by a virtual assistant, a natural language utterance that expresses a request, interpreting the natural language utterance according to a natural language grammar rule for retrieving memo data from the natural language utterance, the natural language grammar rule recognizing query information, responsive to interpreting the natural language utterance, using the query information to query the database for a memo related to the query information, and providing, to a user, a response generated in dependence upon the memo related to the query information.

45 Claims, 13 Drawing Sheets

(56) References Cited

U.S. PATENT DOCUMENTS

| | | | | |
|---|---|---|---|---|
| 2014/0019116 | A1* | 1/2014 | Lundberg | G06F 8/30 |
| | | | | 704/8 |
| 2014/0365222 | A1 | 12/2014 | Weider et al. | |
| 2015/0142704 | A1* | 5/2015 | London | G06N 5/022 |
| | | | | 706/11 |
| 2015/0348551 | A1* | 12/2015 | Gruber | G10L 15/28 |
| | | | | 704/235 |
| 2018/0329982 | A1* | 11/2018 | Patel | G06F 16/3322 |
| 2018/0350353 | A1* | 12/2018 | Gruber | G10L 15/1822 |
| 2019/0258641 | A1* | 8/2019 | Peloski | G06F 16/2379 |
| 2019/0341029 | A1* | 11/2019 | Swierk | G06N 3/0445 |

OTHER PUBLICATIONS

EVA by Voicera | Artificial Intelligence Assistant, downloaded Nov. 28, 2018 from www.voicera.com/ (4 pages).
Kolodner, Janet L., "Organization and Retrieval in a Conceptual Memory for Events or CON51, Where Are You?" IJCAI'81 Proceedings of the 7th international joint conference on Artificial intelligence—vol. 1, Aug. 1981, pp. 227-233, (7 pages).
Zoho, The most beautiful notetaking app across devices, downloaded Nov. 28, 2018 from www.zoho.com/notebook/, (4 pages).
Stifelman, Lisa J., et al., "VoiceNotes: A Speech Interface for a Hand-Held Voice Notetaker", Proceedings of INTERCHI (Amsterdam, The Netherlands, Apr. 24-29, 1993), ACM, New York, 1993, pp. 179-186 (8 pages).

* cited by examiner

| Stage | Ways to Invoke Storage of a Memo | Ways to Query for a Memo | Possible Responses from the Virtual Assistant |
|---|---|---|---|
| 1 | To get a perfect lasagna leave it for 30 minutes in the oven | How long do I usually leave the lasagna in the oven? | You usually leave your lasagna in the oven for 30 minutes |
| 1 | To get a good lasagna, cook it for 30 minutes in the oven | How many minutes should I cook lasagna? | You should cook your lasagna for 30 minutes in the oven |
| 1 | For good lasagna, leave it for 30 minutes in the oven | How long should I leave the lasagna in the oven? | Leave your lasagna in the oven for 30 minutes |
| 2 | For good lasagna, leave it for 30 minutes in the oven | How long should I leave the lasagna in the oven? | Leave your lasagna in the oven for 30 minutes |
| 2 | To get a perfect lasagna leave it for 30 minutes in the oven | How long do I usually leave the lasagna in the oven? | You usually leave your lasagna in the oven for 30 minutes |
| 2 | To get a good lasagna, cook it for 30 minutes in the oven | How many minutes should I cook lasagna? | You should cook your lasagna for 30 minutes in the oven |
| 3 | For good lasagna, leave it for 30 minutes in the oven | Where to I usually cook lasagna? | You usually cook lasagna in the oven, would you like to know how long to cook it? |

TABLE 1

FIG. 9

| Ways to Invoke Storage of a Memo | Ways to Query for a Memo | Possible Responses from the Virtual Assistant |
|---|---|---|
| I (put\| am putting \|'ll put \|will put) + <variable1> (list of common objects that people lose) + (in the \| in my) + <variable2> (list of common places people put/hide things) | Where did I put + <variable1>? | You put + <variable1> + (in \| above \| inside \| below \| under \| outside, etc.) + <variable2> |
| I (keep \| am keeping \| will keep) + <variable1> (list of common objects that people lose) + (in the \| in my) + <variable2> (list of common places people put/hide things) | Where do I keep + <variable1>? | Try (in \| above \| inside \| below \| under \| outside, etc.) + <variable2>. |
| The + <variable1> (list of common objects that people lose) + (is \| are) + (in \| above \| inside \| below \| under \| outside, etc.) + <variable2> (list of common places people put/hide things) | Where (is \| are) + <variable1>? | You keep + <variable1> + (in \| above \| inside \| below \| under \| outside, etc.) + <variable2> |

TABLE 2

FIG. 10

| Ways to Invoke Storage of Favorite Information | Ways to Query the Favorite Information | Possible Responses from the Virtual Assistant |
|---|---|---|
| My favorite restaurant is Orchard City Kitchen | Give me directions to my favorite restaurant | Here are the directions to Orchard City Kitchen |
| Can you add Orchard City Kitchen to my favorites list? | Is my favorite restaurant open now? | Yes, Orchard City Kitchen is open now. |
| I really like food and service at Orchard City Kitchen | What was the name of the restaurant I really like? | You said you like Orchard City Kitchen. |

TABLE 3

FIG. 11

| Ways to Invoke Storage of Favorite Information | Ways to Query the Favorite Information | Possible Responses from the Virtual Assistant |
|---|---|---|
| The gym I usually go to is OrangeTheory Fitness in Santa Clara | How long will it take me to get to the gym? | It will take you 15 minutes to get to the gym |
| I usually work out at OrangeTheory Fitness in Santa Clara | Are there any burger places near my gym? | Here's the list of burger places around your gym |
| Can you mark OrangeTheory Fitness in Santa Clara as my gym? | When does my gym open on Sunday? | Your gym opens at 7 AM on Sunday |

TABLE 4

FIG. 12

| Ways to Invoke Storage of Favorite Information | Ways to Query the Favorite Information | Possible Responses from the Virtual Assistant |
|---|---|---|
| My favorite Chinese restaurant is Soong Soong in San Jose | Give me directions to my favorite Chinese restaurant | Here are the directions to Soong Soong |
| Can you add Psycho Donuts and Krispy Kreme to my favorites list? | Which donut places from my favorites list are open now? | Both Psycho Donuts and Krispy Kreme are open now. |
| I really like food at Orchard City Kitchen in Campbell, and Amakai in Santa Clara | What was the name of the restaurant in Campbell that I really like? | You said you like Orchard City Kitchen. |

TABLE 5

FIG. 13

USING A VIRTUAL ASSISTANT TO STORE A PERSONAL VOICE MEMO AND TO OBTAIN A RESPONSE BASED ON A STORED PERSONAL VOICE MEMO THAT IS RETRIEVED ACCORDING TO A RECEIVED QUERY

BACKGROUND

Existing note-taking applications, such as Evernote® and Simplenote®, allow users to write notes using a manual input modality. However, such applications do not record memos, play back memos or play back intelligent interpretations of memos using a spoken modality.

Some voice memo applications, such as Zoho Noteboook® and Voice Memos® for iOs®, allow users to record and play back memos, starting and stopping using a manual modality (see submitted non-patent literature "Zoho"). However, such applications do not support explicit or implicit searching for information in memos or retrieving information from the memos using voice modalities.

Conventional smart-speaker virtual assistants allow storing and retrieving information using voice in limited ways. For example, Google Assistant® and Siri® can add and retrieve events from a cloud-stored calendar. However, using the feature requires the user to carefully specify the content and the requests precisely to make the system do what is desired. For example, if a user asks Siri® "When is my husband's birthday?" and that information has not been pre-set in that user's device or device ecosystem, Siri® willy reply "I don't know who your husband is."

Cardona® teaches, at a high level, how to use various current commercial virtual assistants to store any arbitrary voice notes (see submitted non-patent literature "Cardona"). All systems implemented by Cardona® essentially transcribe speech to text that users can only retrieve through a visual modality. Prior art systems do not allow even for a system to read back, using text-to-speech notes or a summary of notes using speech. Doing such without significantly wasting the time of a user listening to extraneous neighboring words and irrelevant information is a non-trivial and unsolved problem.

Voicera® describes the existence, without enablement, of summarization of voice notes (see submitted non-patent literature "Voicera"). However, Voicera® still relies on a visual modality for reviewing information and does not address the problem of providing relevant information for users, using a speech modality, without wasting time with extraneous neighboring words and irrelevant information.

U.S. Patent Application Publication No. 2006/0064411 A1 with title "Search engine using user intent" filed by Gross, et al., teaches a system for searching with results ranked based, in part, on past user activity. However, it does not use natural language and is not applicable to conversational voice search. Also, it does not provide for a user to explicitly retrieve stored information.

U.S. Pat. No. 6,675,159 B1 with title "Concept-based search and retrieval system" issued to Lin, et al., teaches a system for natural-language-based retrieving of multimedia information stored with appropriate attribute metadata. However, the system only addresses retrieving multimedia information. It does not teach retrieval of information used to complete the interpretations or respond verbally to natural language queries.

The submitted non-patent literature "Kolodner" teaches a specific speed-and-storage efficient method for storing and organizing facts for natural-language-based storage and retrieval. It is limited to a single domain of knowledge and would not be practical to implement for any arbitrary domains or conversation topics.

U.S. Patent Application Publication No. 2014/0365222 A1 with title "Mobile systems and methods of supporting natural language human-machine interactions" filed by Weider teaches a method of storage and retrieval of personal information, such as user profile and environmental information. However, it does not extract information from conversational natural language expressions, and it does not filter for particular relevant information to retrieve for interpreting and responding to later natural language requests.

Thus, a need arises for speech recognition technology that is capable of recording voice memorandums (i.e., memos), intelligently storing the memos along with information derived from the memos, and intelligently retrieving information contained in or derived from the stored memos.

Additionally, voice-enabled virtual assistants currently do not have the capability to intelligently learn the preferences or favorites of a user and then later use that information to answer a question from the user. For example, Siri® does not learn a person's preferences or favorites in an intelligent manner. Specifically, when a user asks Siri® "What is my favorite restaurant?" Siri® thinks that the user is asking about Siri's preference and a response is provided to the user as "I don't eat out that much." Furthermore, when other virtual assistants are asked "What is my favorite restaurant?" they pick a restaurant that has the word "favorite" in its name, such as "My Favorite Cafe." The Google Maps® application has an option to add places to a "Favorites" list, a "Want to Go" list or a "Starred Places" list, but it does not allow those lists to be queried using one's own voice. Google Assistant® has a feature of remembering a favorite place; however, it is able to store only a limited number of places and doesn't allow users to reliably query them (e.g., give directions to that place). For example, a Google Assistant® (GA) interaction goes as follows: (i) user: "do you know what my favorite restaurant is?"; (ii) GA: "I don't know that yet. What's your favorite restaurant?"; (iii) user: "my favorite restaurant is Red Lobster," (iv) GA: "OK, I'll remember that."; (v) user: "do you know what is my favorite beach?"; (vi) GA: "I remember you told me. 'My favorite restaurant is Red Lobster'."; (vii) user: "can you give me directions to my favorite restaurant?"; and (viii) GA: "Here you go. Directions from your location to IHOP . . . ." As is clear from the prior art, there is much needed improvement with respect to incorporating a user's preferences or favorites into a voice-enabled virtual assistant.

Accordingly, an additional need arises for speech enabled virtual assistants that intelligently store favorite information of a user for subsequent retrieval and presentation to the user at the appropriate time.

SUMMARY

The technology disclosed relates to (i) speech enabled virtual assistants implementing technology that is capable of recording voice memorandums (i.e., memos), intelligently storing the memos along with information derived from the memos, and intelligently retrieving information contained in or derived from the stored memos and (ii) speech enabled virtual assistants implementing technology that intelligently stores favorite information of a user for subsequent retrieval and presentation to the user at the appropriate time.

Regarding the recording, storage and retrieving of memos, the technology disclosed receives (by a virtual assistant) a natural language utterance that includes memo information, interprets the received utterance according to a natural language grammar rule associated with a memo domain and stores (in a database) a memo that is derived from the interpretation of the memo information, receives another natural language utterance expressing a request (i.e., a request to query memo data from the database), interprets the natural language utterance expressing a request according to a natural language grammar rule for retrieving memo data from the natural language utterance, such that the natural language rule for retrieving memo data recognizes query information, in response to a successful interpretation of the natural language utterance, uses the recognized using the recognized query information to query the database for specific memo data related to the recognized query information, and provides, to the user, a response generated in dependence upon the queried-for specific memo data.

Regarding the storing and retrieval of favorite information, the technology disclosed operates in a similar manner as the storing and retrieval of memos.

Particular aspects of the technology disclosed are described in the claims, specification and drawings.

BRIEF DESCRIPTION OF THE DRAWINGS

FIG. 9 illustrates TABLE 1, which includes example phrases that would trigger the storing of a personal memo.

FIG. 10 illustrates TABLE 2, which includes example phrases that would trigger the storing of a personal memo.

FIG. 11 illustrates TABLE 3, which includes example ways of invoking the storing of favorite information, querying favorite information and possible responses from a virtual assistant.

FIG. 12 illustrates TABLE 4, which includes example ways of using favorite information for obtaining directions and travel information.

FIG. 13 illustrates TABLE 5, which includes example ways of storing multiple favorites for a specific category and then later obtaining specific information for both of the favorites in the same category or obtaining favorite information of multiple favorites based on geographical location.

DETAILED DESCRIPTION

Figure 1:
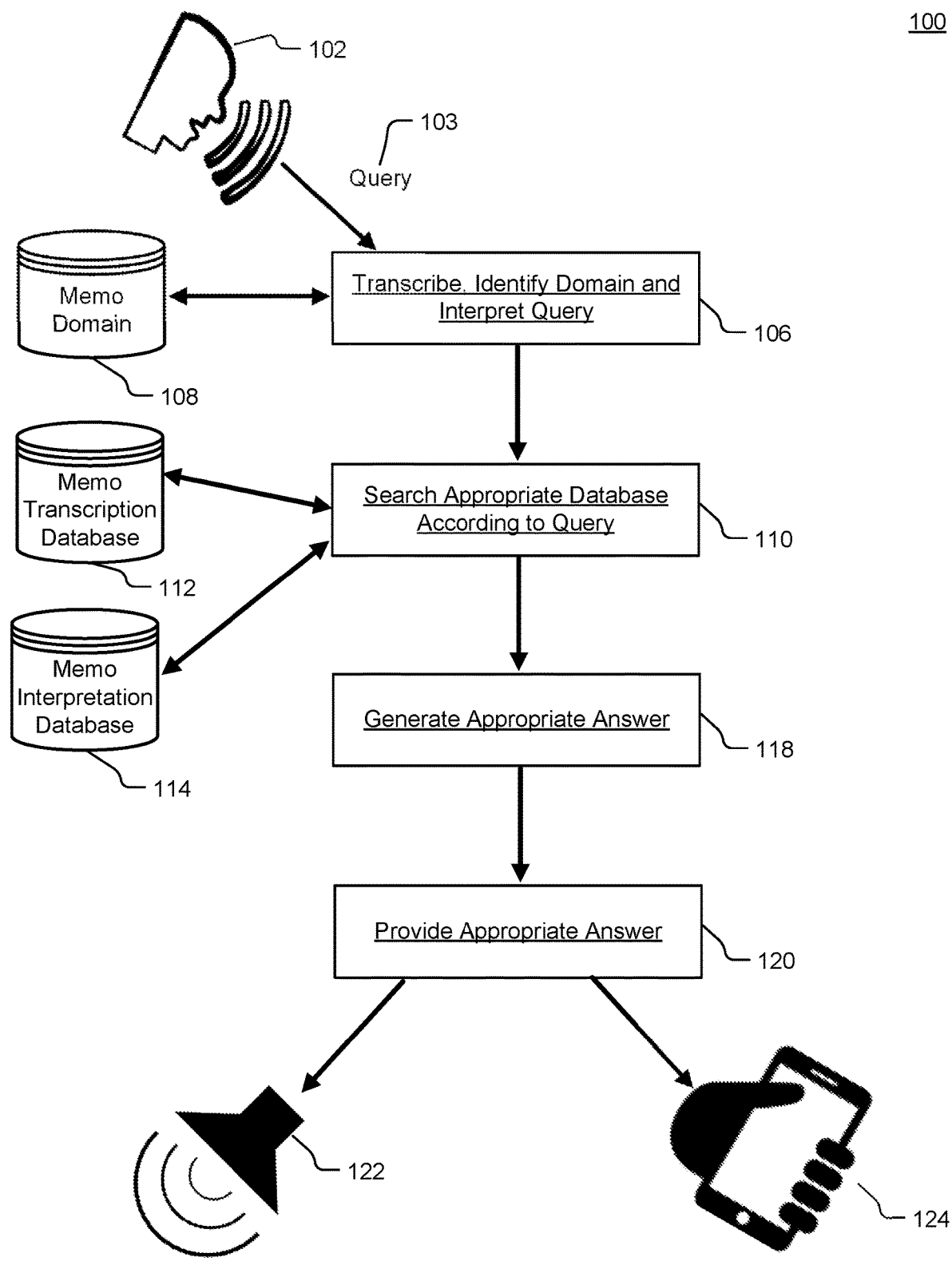
FIG. 1 illustrates a block diagram of an example environment capable of speech enabled virtual assistants implementing technology that is capable of receiving a request or query and intelligently retrieving information contained in or derived from previously stored memos.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Examples of Voice Memorandums

An aspect of the technology disclosed relates to speech-enabled virtual assistants implementing recognition technology that is capable of recording voice memorandums (i.e., memos, or personal memos), intelligently storing the memos along with information derived from the memos, and intelligently retrieving information contained in or derived from the stored memos. Two specific examples of this speech recognition technology that is capable of recording and intelligently storing memos and related information and retrieving information in dependence upon the stored memos are provided below.

The first example relates to cooking lasagna. The scenario is that just about every recipe on the internet indicates that lasagna should be cooked for 40 minutes. However, a particular user has determined that with their oven 40 minutes is too much, and as a result, their lasagna is always burned. The user was able to determine through experience that the perfect cooking time for their lasagna is 30 minutes. In order to remember that the perfect time for cooking lasagna in their oven is 30 minutes, the user will have an interaction with a virtual assistant (or some other type of technology that is capable of speech recognition and feedback) as follows (note that only the text in italics is the voice exchange or interaction with the virtual assistant; and the virtual assistant is named Hound):

(i) User: "*Ok Hound. To get a perfect lasagna, I cook it in the oven for 30 minutes.*" [this phrase uttered from the user was identified by the virtual assistant as being related to a memo or a memo domain in dependence upon the virtual assistant identifying the trigger words "I" a personal pronoun and "cook" a verb)].

(ii) User: "*Ok Hound. How long should I cook the lasagna?*" [this phrase uttered from the user was identified by the virtual assistant as being related to querying a memo or a memo domain in dependence upon the virtual assistant identifying a request (e.g., an interrogatory) and trigger words such as "I" a personal pronoun and "cook" a verb)].

(iii) Hound: "*You should cook the lasagna 30 minutes in the oven.*" [this response from the virtual assistant was generated by obtaining the stored memo or information relating to the memo that indicated the cooking time in the oven for lasagna is 30 minutes].

The second example relates to finding or locating lost objects. The scenario is that a user places an object somewhere (e.g., for hiding or storage), where the user wants to be sure to remember where the object was placed. Instead of writing a text, email or physical message to oneself, the user would have the following interaction with the virtual assistant.

(i) User: "Hound, remember that I put the car key in my brown bag." [this phrase uttered from the user could be identified by the virtual assistant as being related to a memo or memo domain in dependence upon the virtual assistant identifying the wake phrase "Hound, remember."]

(ii) User: "Ok Hound. Where did I put my car key?"

(iii) Hound: "You put your car key in your brown bag."

Examples of Favorites

Another aspect of the technology disclosed relates to speech enabled virtual assistants implementing technology that intelligently stores favorite information of a user for subsequent retrieval and presentation to the user at the appropriate time. A concept is that the favorite information of the user is stored, such as favorite restaurants, grocery stores, beauty salons, gyms, recreation spots, parking garages, friends and family, etc. and then later used to answer inquiries from the user. Three specific examples of this technology that is capable of recording and intelligently storing memos and related information and retrieving information in dependence upon the stored memos are provided below.

The first example relates to favorite places and the scenario is that the user tells the virtual assistant about a favorite restaurant and then later on asks for directions to that restaurant.

(i) User: "Ok Hound, my favorite restaurant is Spice Me at Half Moon Bay." [this information conveyed from the user, triggered "favorites" or a favorites domain and in particular a favorite restaurant in dependence upon the trigger words "favorite" and "restaurant."].

(ii) User: "Ok Hound, give me directions to my favorite restaurant."

(iii) Hound: "Here you are . . ." (and directions are provided to the user in one of various forms, such as spoken word, opening up a map or directions application, etc.).

The second example relates to a routine commute and the scenario is that the user goes to the same gym, bar, grocery store etc. on a regular basis, so she tells the virtual assistant to remember this particular place as a favorite for later retrieval.

(i) User: "Ok Hound, the gym I usually go to is Orange Theory Fitness® in Santa Clara." [favorites or favorites domain is triggered by the words "I" and "usually"].

(ii) User: "Ok Hound, how long will it take me to get to the gym?"

(iii) Hound: "It will take you 15 minutes to get to the gym." [the virtual assistant utilizes the information of the user's favorite gym to determine which gym the user is referring to and then estimate how long it will take to get there using the typical transportation scheme used by the user to get to the gym in view of present traffic conditions].

The third example relates to making recommendations and the scenario is that a user asks a virtual assistant for a recommendation, where the user has previously given the virtual assistant some information about favorite restaurants, etc. or perhaps where the user has not previously provided favorite information.

(i) User: "Ok Hound, give me a restaurant recommendation."

(ii) Hound: "Tell me what kind of food you like."

(iii) User: "I like Thai Food and Italian food the most."

(iv) User: "Ok Hound, are there any restaurants around I might like?"

(v) Hound: "I have two restaurants that are close by that serve your favorite types of food but based on the fact that you recently had Thai food I will recommend Pasta Moon Italian Restaurant at Half Moon Bay."

Discussion of the Figures

Now, turning the figures, various example aspects of the technology disclosed are provided below.

FIG. 1 illustrates a block diagram of an example environment 100 capable of speech enabled virtual assistants implementing technology that is capable of receiving a request or query and intelligently retrieving information contained in or derived from previously stored memos. The term "intelligently retrieving" is mentioned because the environment 100, as discussed in further detail below, is capable of not just repeating a previous statement made by the user but is able to derive a more useful response to the user, as a result of having previously stored a memo or personal memo provided by the user.

In particular, FIG. 1 illustrates that the example environment 100 includes a speech input 102 being received from a microphone or some other type of input device (e.g., an application running on a mobile phone or tablet, etc.). The speech input 102 includes search or query request 103 (hereinafter query 103). The query 103 can be in the form of a natural language utterance spoken by the user.

The speech input 102 can be received by a virtual assistant (not illustrated) as query 103. Speech enabled virtual assistants will simply be referred to herein as "virtual assistants" or a "virtual assistant." A virtual assistant can be a device or an application residing on a device, such as a smart phone, a watch, glasses, a television, an automobile, etc. The virtual assistant is capable of interacting with a user using the user's speech and is capable of, for example, (i) providing information back to the user (e.g., an answer to a question), (ii) providing an actionary response (e.g., changing the thermostat or locking the doors to an automobile) or (iii) storing information for later retrieval (remotely or locally) or for increasing the knowledge base of the virtual assistant. A virtual assistant can monitor sound (e.g., conversations) to listen for a wake phrase that engages the virtual assistant and to listen to a trigger phrase uttered after the wake phrase that directs the virtual assistant (or any system in communication with the virtual assistant) to a particular domain. A wake phrase can be just one word or multiple words and a trigger phrase can be just one word or multiple words.

Referring back to FIG. 1, the query 103 will be transcribed by the virtual assistant (or a system connected to the virtual assistant as described below with respect to FIG. 7) in operation 106. Next, in operation 106, text obtained from the transcriptions of the query 103 will be used to determine whether or not the user intended to query a particular domain, such as a memo domain 108. If the memo domain 108 is identified, then the text obtained from the transcriptions will be interpreted using a particular grammar rule.

Regarding domains and grammar rules, a domain represents a particular subject area, and comprises or is associated with a specific grammar rule. A specific grammar rule is not necessarily one single rule but can be a set of rules that are suited to interpret a transcription of a natural language utterance that is related to a specific domain. The process of interpreting a natural language utterance within a particular domain produces exactly one interpretation. Different interpretations arise when systems interpret a natural language utterance in the context of different domains. Each interpretation represents the meaning of the natural language utterance as interpreted by a domain. For example, when users make requests, such as asking "What time is it?" or directing the system to "Send a message." Systems provide responses, such as by speaking the time. Systems also make requests of users, such as by asking, "To whom would you like to send a message?", and in reply, users respond, such as by replying, "Mom." Sequences of one or more requests and responses produce results such as sending a message or reporting the time of day. The interactions regarding the "time" are interpreted, for example, using a "time domain" with specific grammar rule that is suited for interpreting text related to time. The same for "messages," which implement a "messages domain." Sub-domains can also exist. The number of domains is limitless, as well as the specific grammar rules implemented by or included in the domains. These are merely non-limiting examples of domains, grammar rules, transcriptions and domains.

Turing back to FIG. 1, when the received natural language utterance expresses a request, the natural language utterance that expresses the request can be interpreted according to a natural language grammar rule for retrieving memo data. This rule is obtained from the memo domain 108. Further, the natural language grammar rule is interpreted to recognize query information from the natural language utterance (e.g. query 103). As an example, in operation 106 the received natural language utterance is "How long should I cook lasagna?"

Responsive to the interpretation and obtaining of the query information, an appropriate database will be searched or queried. According to one aspect of the present invention, in operation 110 a memo transcription database 112 can be queried using the interpreted natural language utterance. The memo transcription database 112 includes text from previous natural language utterances directed to personal memos. The memo transcription database 112 can be an unstructured or a structured database storing unstructured or structured data. However, as previously discussed, merely providing text back to a user that has not been interpreted according to specific domain would not be as helpful to the user. An example of such text would be "To get a perfect lasagna, I cook it in the oven for 30 minutes." This is just a simple transcription of a previously stored or recorded personal memo (e.g., a word-for-word repeat of a transcription). While this is not a perfect answer to the user's query, it still provides enough information. Additionally, the actual recording of the natural language utterance that expresses the query 103 can be stored in another database, or even the memo transcription database 112 and/or the memo interpretation database 114. Further, the text stored in the memo transcription database 112 or the recording stored in another database can be stored for the purpose of later re-interpretation. For example, grammar rules of domains can be improved over time, therefore providing more accurate interpretations as time goes on. By storing the original text or recording that was used to create a first interpretation using the memo domain 108, it is possible to re-interpret the original text or recording if the grammar rules have been improved upon.

According to another aspect of the present technology, in operation 110, a memo interpretation database 114 is queried using the interpreted natural language utterance. The memo interpretation database 114 includes interpretations of natural language utterances directed to personal memos. The memo interpretation database 114 can be an unstructured or a structured database storing unstructured or structured data. Because the interpretations of the natural language utterances are made using a particular natural language grammar rule associated with the memo domain 108, the information stored and retrieved from the memo interpretation database 114 will be easier to search and provide more accurate and meaningful results. An example memo retrieved from the memo interpretation database 114 could be structured data, such as "cook.lasagna.oven.30-minutes" that can be used to generate a response, or an example memo retrieved from the memo interpretation database 114 could already be in a form that is phrased as a natural language response such as "Violet, you should cook your lasagna in your oven for 30 minutes."

After obtaining the memo from the memo transcription database 112 or the memo interpretation database 114 in operation 110, operation 118 generates an appropriate answer (response) for the user. As discussed above and in further detail below, an aspect of the technology disclosed is capable of providing a meaningful (appropriate) response to the user that is not simply necessarily a word-for-word repeat of a previously stored transcription, but something that is sufficient to and will actually be more helpful to answering the users request or query. If operation 110 obtains the memo from the memo transcription database 112, then the memo can be further interpreted using the specific grammar rule for retrieving memo data. For example, the retrieved memo "To get a perfect lasagna, I cook it in the oven for 30 minutes" could be interpreted to generate a response such as "Violet, you should cook your lasagna in your oven for 30 minutes." If the memo retrieved from the memo interpretation database 114 is structured as "cook.lasagna.oven.30-minutes," the system will generate "Violet, you should cook your lasagna in your oven for 30 minutes," as an appropriate response. Once the appropriate response or answer is generated in operation 118, the appropriate response or answer will be provided to the user in operation 120, in the form of speech 122 or message/text to a mobile device 124 or some other device similar thereto.

Figure 2:
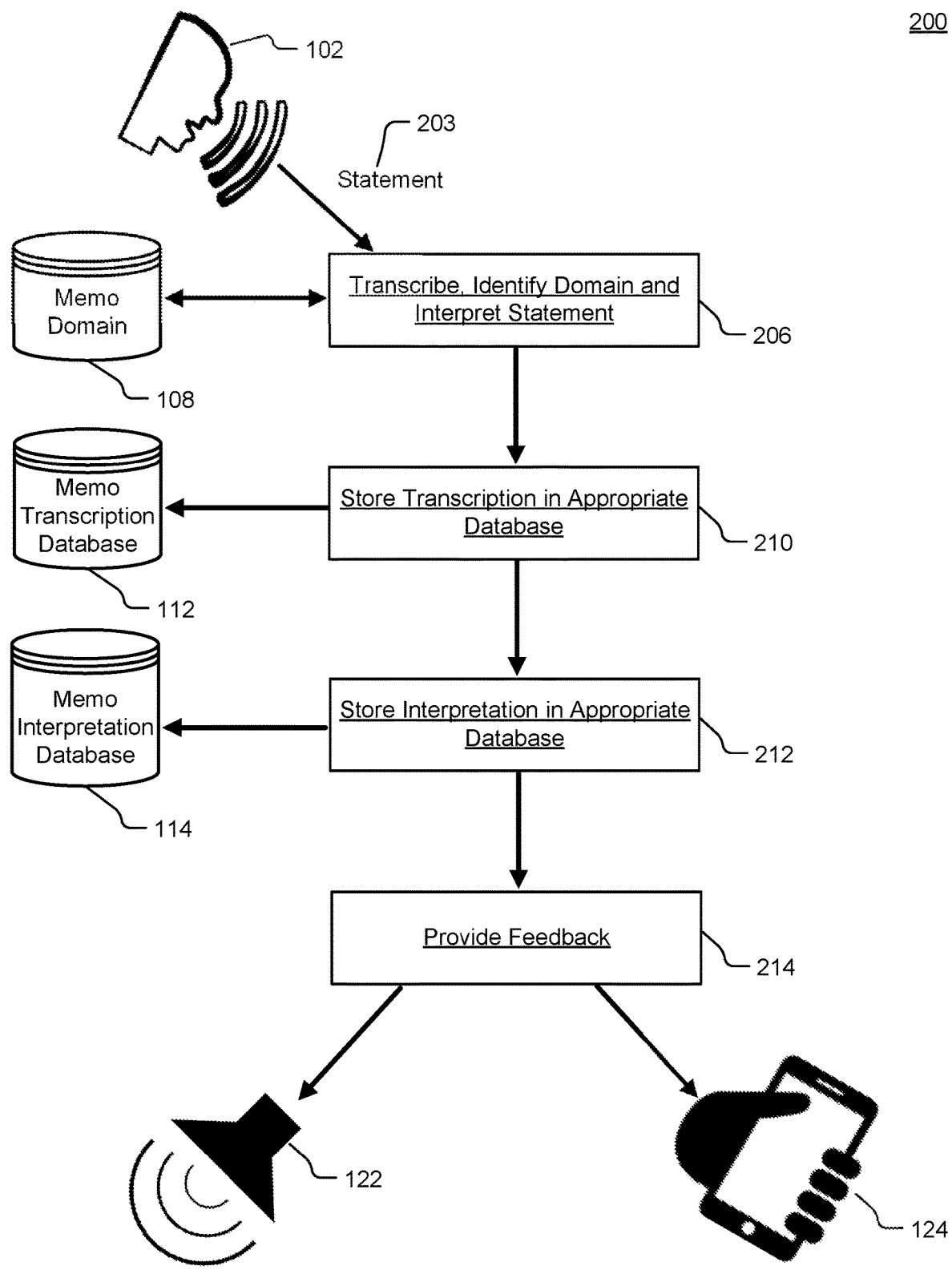
FIG. 2 illustrates a block diagram of an example environment capable of speech enabled virtual assistants implementing technology that is capable of recording voice memorandums (i.e., memos) and intelligently storing the memos along with information derived from the memos.

FIG. 2 illustrates a block diagram of an example environment capable of speech or text enabled virtual assistants implementing technology that is capable of recording voice memorandums (i.e., memos) and intelligently storing the memos along with information derived from the memos.

Specifically, FIG. 2 illustrates an environment 200 that implements the storing of a natural language utterance in the memo transcription database 112 and/or the memo interpretation database 114. The environment of FIG. 2 is very similar to that of FIG. 1, except that a statement 203 is received that causes the virtual assistant to store some or all of the statement 203 as a memo as opposed to conducting a query. Descriptions of redundant elements of FIG. 2 are omitted.

In operation 206 the statement 203 is transcribed and then a domain, such as the memo domain 108 is identified. Just as in FIG. 1, where the query 103 is transcribed and interpreted, the text transcribed from the statement 203 is interpreted using a specific grammar rule for storing a memo that is associate or included in the memo domain 108. For example, the natural language utterance (e.g., statement 203) received from the user can be interpreted according to a natural language grammar rule for storing memo data. In operation 210 the memo, obtained from the transcription of the natural language, is stored as a transcription in the memo transcription database 112 and in operation 212 the memo, obtained from an interpretation of the natural language utterance is stored in the memo interpretation database 114. Additionally, the actual recording of the natural language utterance that expresses the statement 203 can be stored in another database, or even the memo transcription database 112 and/or the memo interpretation database 114. The differences between transcriptions and interpretations and between the memo transcription database 112 and the memo interpretation database 114 are described above in detail with reference to FIG. 1.

In operation 214 feedback is provided to the user in the form of speech 122 or message/text to a mobile device 124 or some other device similar thereto. The speech can include a request for confirmation to the user to confirm whether or not they intended to store a personal memo, or a confirmation to the user that the information has been stored as a personal memo.

One aspect of the technology disclosed includes assigning a time period to a memo after which the memo will expire and then removing the memo (or memo related information) from the memo transcription database 112 and/or the memo interpretation database 114.

Another aspect of the technology disclosed includes interpreting the query 103 and/or the statement 203 according to multiple domains (e.g., multiple grammar rules), wherein each domain of the multiple domains has an associated relevancy score for the interpreted utterance. The memo domain 108 is one domain of the multiple domains and the memo domain 108 has an advantage over the other domains with respect to interpreting queries and statements related to personal memos. As such, when any of the query 103 and/or the statement 203 is directed to a personal memo, the interpretation using the memo domain 108 will have the highest relevance score as compared to the other domains. Additionally, different interpretations of the query 103 and/or the statement 203 using the multiple domains can be stored in the memo interpretation database 114.

The information stored in the memo interpretation database can be stored along with additional information, such as meta-data or meta-information that describes the memo as pertaining to a short-term activity, daily weather, and an until-event such as a child being at soccer practice, which is cancelled (or deleted) when the parent arrived and then leaves the soccer field as a result of picking up the child. The meta-data or meta-information can be explicitly stated by the user (e.g., "I'll be at work until 5 pm") or it can be inferred from other information obtained from the user, such as other personal memos, other calendar information or other routine information obtained from general tendencies of the user.

Additional examples of storing personal memos and then retrieving information related to the stored personal memos are provided below.

Example Wake Phrases and Trigger Phrases for Storage and Retrieval

As mentioned above, virtual assistants or related devices often have wake phrases to indicate to the virtual assistant that the user is attempting to engage or use the virtual assistant. Assuming that the technology disclosed utilizes a standard wake phrase of "Ok Hound" to engage the virtual assistant. One way to indicate that a user's utterance is intended to retrieve information from a stored personal memo would be to assign specific wake phrases, such as "Ok Hound check my personal information for . . . ," or "Hound check my memos for information regarding . . . ". Further, one way to indicate that a user's utterance is intended to be stored as a personal memo would be to assign specific wake phrases, such as "Ok Hound memo," "Hound memo" or "Ok Hound remember." Each of these example wake phrases would immediately indicate that the user is intending to retrieve or store a personal memo. However, sometimes users have difficulty remembering which wake phrases to use in which situation.

Accordingly, the technology disclosed is capable of determining whether or not a natural language utterance received after a generic wake phrase includes a specific trigger phrase to indicate that the user intends to search for a memo or store a memo. For the sake of simplicity, a "trigger phrase" can include just a single word or multiple words, and a "wake phrase" can include just a single word or multiple words. Use of the wake phrase and trigger phrase can be used to make the system understand to record, store and retrieve the information to/from the "memo domain". Additionally, weights on the "memo domain" can be invoked in order to make it the first domain (of multiple other domains) to consider when retrieving information.

The trigger phrases can include personal pronouns, such as "I" (e.g., "Where did I put the key?", "How long do I usually cook Lasagna?") or possessives like "my" (e.g., "Where is my key?"). As another example, a trigger phrase may be identified as being an interrogative pronoun or a relative pronoun that is within 5 words of the personal pronoun, or a trigger phrase may be identified as being a personal pronoun followed by or preceded by an interrogative pronoun or a relative pronoun that is within 5 words of the personal pronoun. These are merely examples of the types of phrases that can be configured to indicate that the user is attempting to retrieve or store a personal memo.

Once the trigger phrase is identified, then the appropriate domain (e.g., memo domain 108) will be selected and an appropriate grammar rule can also be selected in dependence upon the trigger phrase itself, other contents of the natural language utterance or a combination of both.

Cooking Example

For each domain, it is possible to (i) determine and assign all of the possible ways a user would store a personal memo, (ii) retrieve information from the stored personal memo and (iii) determine all of the ways for the virtual assistant to respond to the user.

FIG. 9 illustrates TABLE 1, which includes example phrases that would trigger the storing of a personal memo in the memo domain 108 or a specific sub-domain (e.g., cooking) of the memo domain 108. There can be multiple stages of complexity with respect to the virtual assistant understanding a request and providing an answer to the user. Different stages could be implemented by the virtual assistant due to many factors, such as availability of processing, communication bandwidth, certainty of interpretations and content of personal memos.

Stage 1 examples require the stored memo and the query to be of a similar nature and the response is similar in nature as well. This is somewhat of a one-to-one correlation of the stored memo, the request and the response. This is the least complex of the stages, because the response is closely tied to the query. For example, the first example of stage 1 the query states, "do I usually leave . . . in the oven." and the response states "you usually leave . . . in the oven.".

Stage 2 examples allow for more information to be inferred from the stored memo and the query for the memo and allow for different answers to be derived from the stored memo. Note that the arrows on the first row of stage two indicate that the utterance used to invoke storage can be queried using three different options and there are three possibilities for response. In other words, each cell of stage 2 has three counterpart cells. Although the arrows do not indicate such due to space constraints on TABLE 1, the same goes for the second and third rows of stage two. For example, the second row of stage 2, the user can state "To get a perfect lasagna leave it for 30 minutes in the oven." Now, this personal memo can be queried in, at least, three different ways. In our example here, let's say that the user initiates the query using the phrase "How many minutes should I cook lasagna?" This is different than stage 1, because the virtual assistant has a broader range of potential queries that could result in finding a particular personal memo. The same goes for the response provided by the virtual assistant, such that a response to the query "How many minutes should I cook lasagna?" could be "You usually leave your lasagna in the oven for 30 minutes." as opposed to "you should cook your lasagna for 30 minutes." A particular response can be implemented by the virtual assistant based previous responses that have been successful and/or unsuccessful (e.g., due to the user's vocabulary, etc., certain responses can be more successful than others.

Stage 3 is the most complex stage, because it allows for additional information to be derived from the stored memo, not just the cooking time. In the example for stage 3, the user most likely invoked the storage of the memo with a statement directed to the length of time for cooking lasagna, without really thinking about later retrieving an answer as to "where" the lasagna should be cooked. However, the virtual assistant identified at least two pieces of information from the memo, including the fact that the lasagna is cooked in the oven and that it is cooked for 30 minutes. Therefore, the virtual assistant can answer two different types of questions, including those related to how long to cook the lasagna and those related to where the lasagna should be cooked.

Lost Objects Example

FIG. 10 illustrates TABLE 2, which includes example phrases that would trigger the storing of a personal memo in the memo domain 108 or a specific sub-domain (e.g., object location) of the memo domain 108, as well as ways to query the personal memo and possible responses from the virtual assistant. TABLE 2 is different from TABLE 1, because TABLE 2 also includes examples of grammar rules and sentence parsing that can be implemented to store memos along with additional information and how the memo and additional information can be used to identify a query and structure a response. As described in TABLE 2, each sentence used to invoke storage of a memo is parsed to identify various components. For example, in the first row of TABLE 2, the virtual assistant identifies the personal pronoun "1" and then looks for a verb that is near the "1". Here, any verb such as "put", "am putting", "'ll put" or "will put" that follows the "1" indicates to the virtual assistant that the utterance received from the user is related to the user putting an object somewhere. Continuing with this example, after the verb, the virtual assistant when looks for some variable (e.g., keys) that are likely to be put somewhere. Next the virtual assistant looks for another variable (i.e., variable2) describing where variable1 is placed. Once this personal memo is stored with the additional information obtained from parsing the utterance, the memo can be queried when the user asks a question including any variation of the verb "put" along with variable1 (e.g., keys). Row 1 of TABLE 2 also describes the structure of the response with respect to the information included in the initial statement from the user and the subsequent query.

Invoking User Feedback

The system may invoke user feedback to confirm whether or not a user intended to search for an answer based on a personal memo or to store a personal memo. If the user indicates that they did not intend to query a personal memo, then a different domain will be used to provide a response to the user's question. If the user indicates that they did not intend to store an utterance as a personal memo, then the personal memo will not be stored, or it will be deleted if it was stored. The confirmation requests to the user can be auditory or in the form of text and the user responses to the confirmation quests can be auditory or in the form of text. Additionally, if the virtual assistant cannot locate a memo that provides an answer to the user's request, then the virtual assistant can ask for a clarification.

Dealing with Multiple Related Memos

A user can store and query multiple memos that are related to the same subject. For example, a user may indicate that they put their keys in a refrigerator for safe keeping. Then at a later point the user may indicate that they put their keys in their backpack. Now, when a user asks where their keys are located, the virtual assistant should be able to indicate to the user that their keys are stored in their backpack. This scenario can be handled in many different ways. First, the virtual assistant may store each memo with time information and then make an assumption that when the user asks about the location of their keys, the user is referring to the most recent memo about their keys. This is essentially time ordering all of the memos related to the location of the user's keys. By saving all of the memos regarding the location of the user's keys, the virtual assistant will be able to tell the user where they placed the keys before they were placed in the backpack. This would be helpful if the user actually did not put them in the backpack. In this case, the user would probably find their nicely cooled keys in the refrigerator. To accomplish this, a virtual assistant would parse search type statements to identify entities and attributes of the entities; search a database of memo information for the entity; and for database records related to the entity, check for the most recent one relating to the same attribute. In this example, the entity would be keys and the attribute would be location.

A second option would to delete all previous memos relating to the location of the user's keys upon the storing of the most recent memo regarding the user's keys being in the backpack. To accomplish this, a virtual assistant would parse store type statements to identify entities and attributes; search a database for records about the same attribute of the same entity (only one should be found); delete the record; and store a new record with the new information about the entity and its attribute.

Additionally, the technology disclosed can understand when memos relate to changes in time. For example a user might say "Ok Hound, remember that I pick up my dog every day of the workweek at 5 pm from doggy daycare" (this is a memo related every Monday through Friday) or "Ok Hound, remember that today I pick up the dog at 4 pm from doggy hair salon" (this is a memo related to a specific day). Specific trigger phrases that will help indicate these behaviors are "every day," "today," and "tomorrow").

Figure 3:
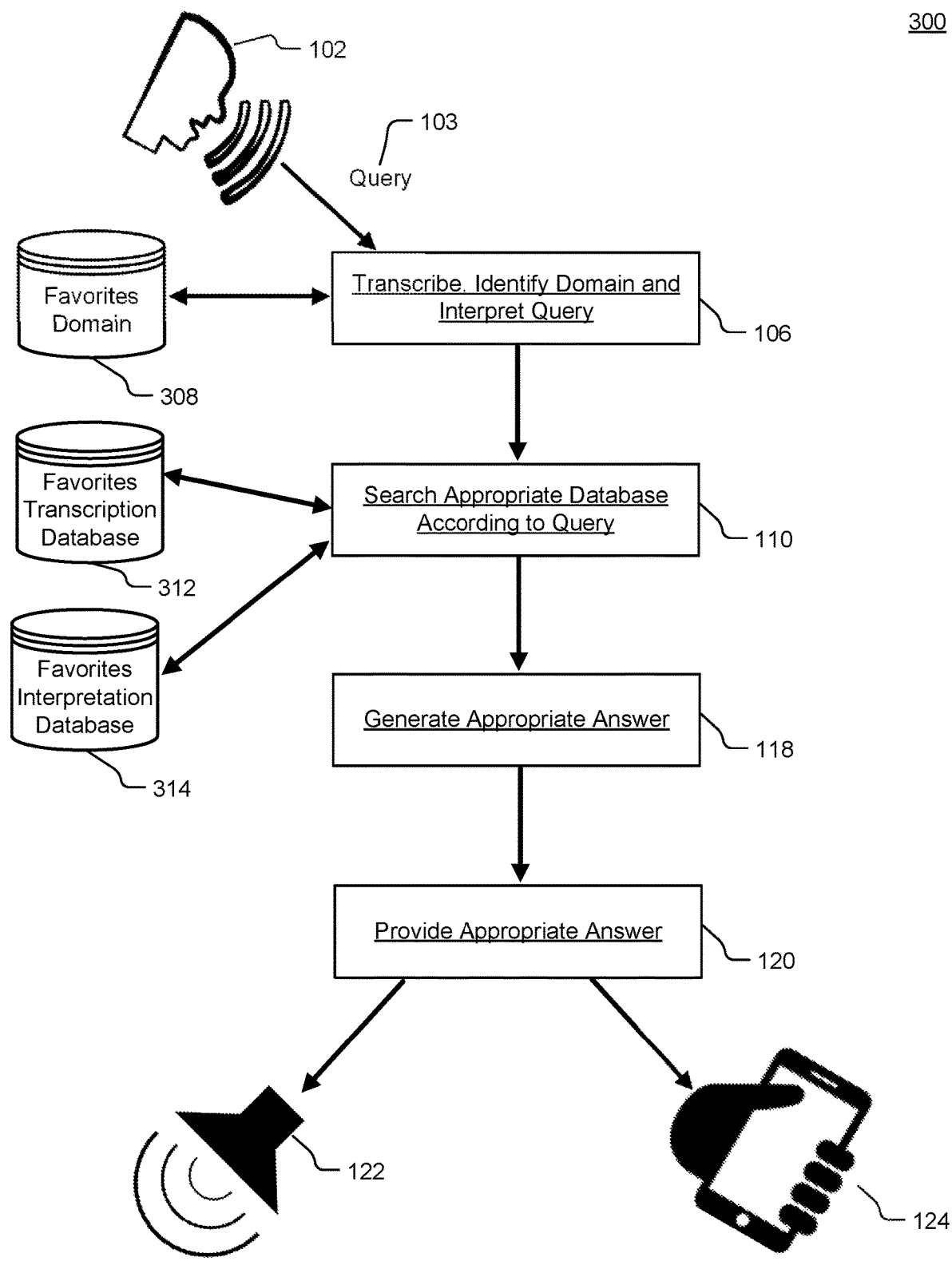
FIG. 3 illustrates a block diagram of an example environment capable of speech enabled virtual assistants implementing technology that intelligently retrieves and presents favorite information of a user contained in or derived from previously identified and stored favorites.

FIG. 3 illustrates a block diagram of an example environment capable of speech enabled virtual assistants implementing technology that intelligently retrieves and presents favorite information of a user contained in or derived from previously identified and stored favorites.

Specifically, the environment 300 illustrated in FIG. 3, is similar to the environment 100 of FIG. 1, except that the query 103 is directed to a favorites domain 308 for the purpose of obtaining information from a favorites transcription database 312 or a favorites interpretation database 314. The favorites domain 308 is similar to the memo domain 108 of FIG. 1, except that the favorites domain 308 has a different grammar rule for interpreting the query 103. Furthermore, the favorites transcription database 312 stores transcriptions of previously stored natural language utterances related to "favorites" of a user and the favorites interpretation database 314 stores interpretations of natural languages related to "favorites" of a user.

Generally, favorites are different from personal memos, because they are inherently narrower in scope and have a longer duration of relevance. Some example categories of favorites could be favorite types of food, grocery stores, hotels, friends, gymnasiums or recreation facilities, hair dressers, schools, colleges, sports teams, etc.

Figure 4:
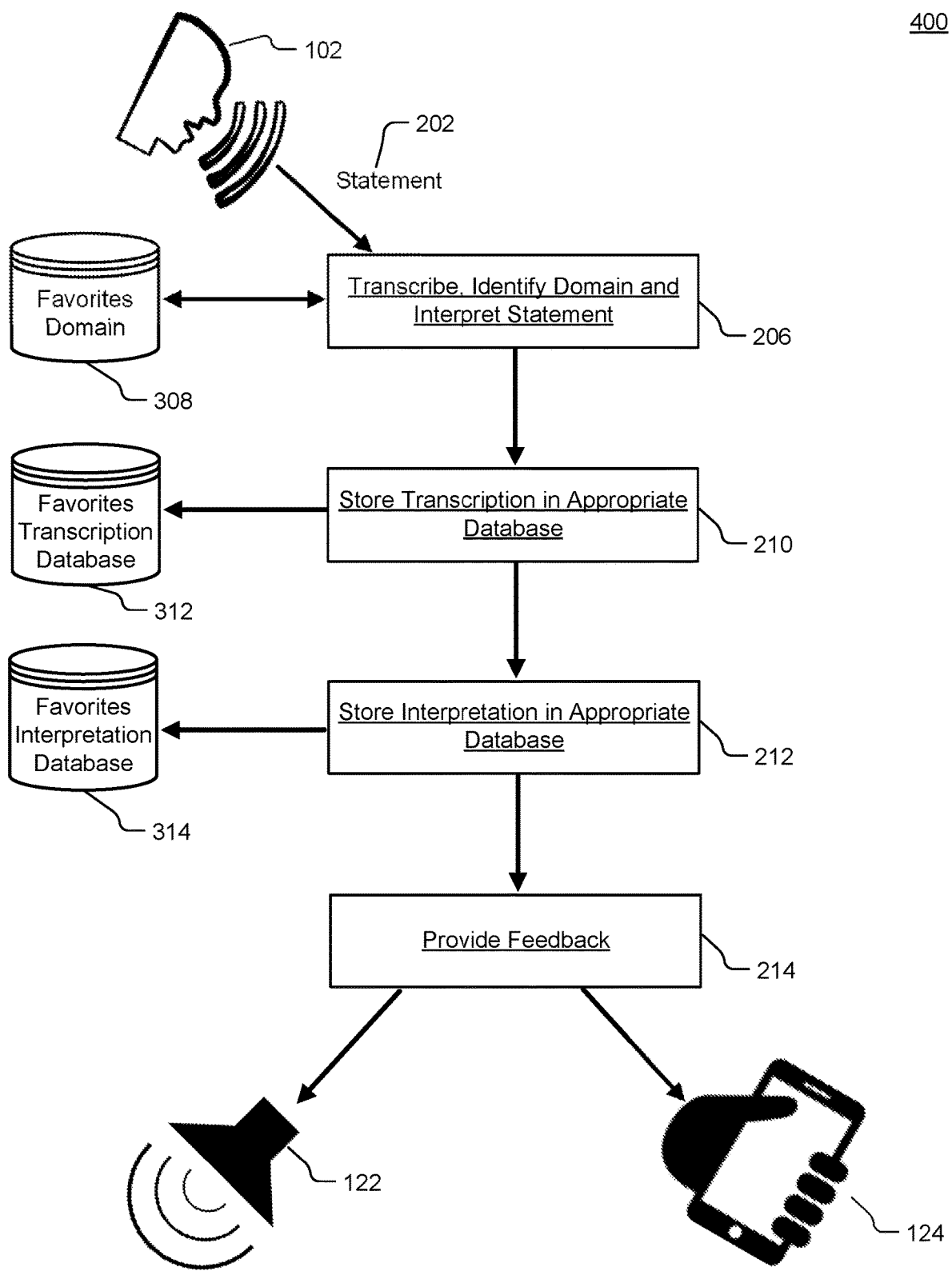
FIG. 4 illustrates a block diagram of an example environment capable of speech enabled virtual assistants implementing technology that is capable of receiving favorites and intelligently storing the favorites along with information derived from the favorites.

FIG. 4 illustrates a block diagram of an example environment capable of speech enabled virtual assistants implementing technology that is capable of receiving favorites and intelligently storing the favorites along with information derived from the favorites.

The environment 400 of FIG. 4 is similar to the environment 200 of FIG. 2, except that the statement 202 is (i) interpreted using the favorites domain 308, (ii) transcribed and stored in the favorites transcription database 312 and (iii) interpreted for storage in the favorites interpretation database 314. All of the descriptions provided above with respect to FIGS. 1 and 2 and memos, as provided above are applicable to the storing and retrieval of favorites and information derived from the favorites. For example, wake phrases, trigger phrases, etc., are applicable to favorites. Additionally, a memo and/or memo related information can indicate that a specific entity is a favorite of the user. Some examples of retrieving favorite information of the user and storing information related to a user's favorite are discussed below.

FIG. 11 illustrates TABLE 3, which includes some example ways of invoking the storing of favorite information, querying favorite information and possible responses from a virtual assistant.

FIG. 12 illustrates TABLE 4, which is similar to TABLE 3, except that it illustrates some example ways of using favorite information for obtaining directions and travel information.

FIG. 13 illustrates TABLE 5, which is similar to TABLE 4, except that it illustrates some example ways of using storing multiple favorites for a specific category and then later obtaining specific information for both of the favorites in the same category or obtaining favorite information of multiple favorites based on geographic location.

Other example implementations of "favorites" can include building a recommendations table base on user's stored favorites. Here is an example: (i) User: "I like Red Lobster® Restaurant"; (ii) Virtual Assistant: obtains information regarding Red Lobster Restaurant from another service, such as Yelp® (e.g., Seafood/Bar/Kids' menu/Casual & Cozy/3.9 stars/etc.); (iii) User "Are there any restaurants around here I might like?"; (iv) Virtual Assistant: "There are other restaurants in the area that have similar characteristics and ratings as your other favorites such as Fish Market Restaurant in San Mateo, would you like me to provide you with a full list of options?"

Figure 5A:
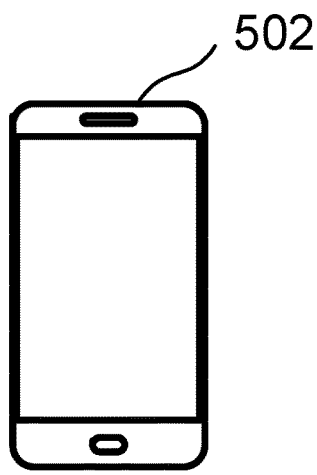
FIGS. 5A, 5B and 5C show three examples implementations of the technology disclosed using different types of virtual assistants.

FIGS. 5 A, 5B and 5C show three example implementations of the technology disclosed using different types of virtual assistants. For example, FIG. 5A illustrates a mobile phone 502. Because mobile phones are battery-powered, it is important to minimize complex computations so as not to run down the battery. Therefore, mobile phone 502 may connect over the Internet to a server. The mobile phone 502 has a visual display that can provide information in some use cases. However, the mobile phone 502 also has a speaker, and in some use cases the mobile phone 502 may respond to an utterance using only speech.

Figure 5B:
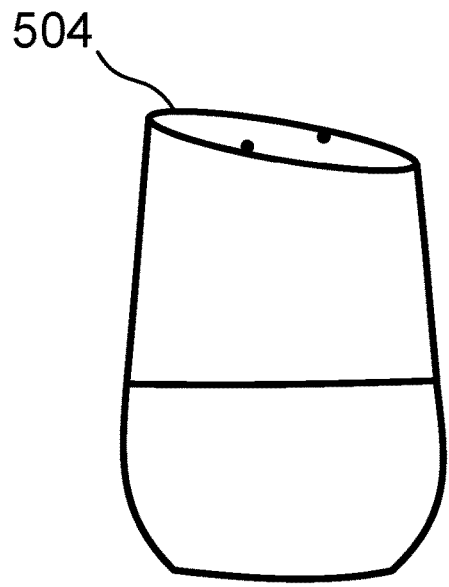

FIG. 5B also illustrates a home assistant device 504, which may plug into a stationary power source, so it has power to do more advanced local processing than the mobile phone 502. Like the mobile phone 502, the home assistant device 504 may rely on a cloud server for interpretation of utterances according to specialized domains and in particular domains that require dynamic data to form useful results. Because the home assistant device 504 has no display, it is a speech-only device.

Figure 5C:
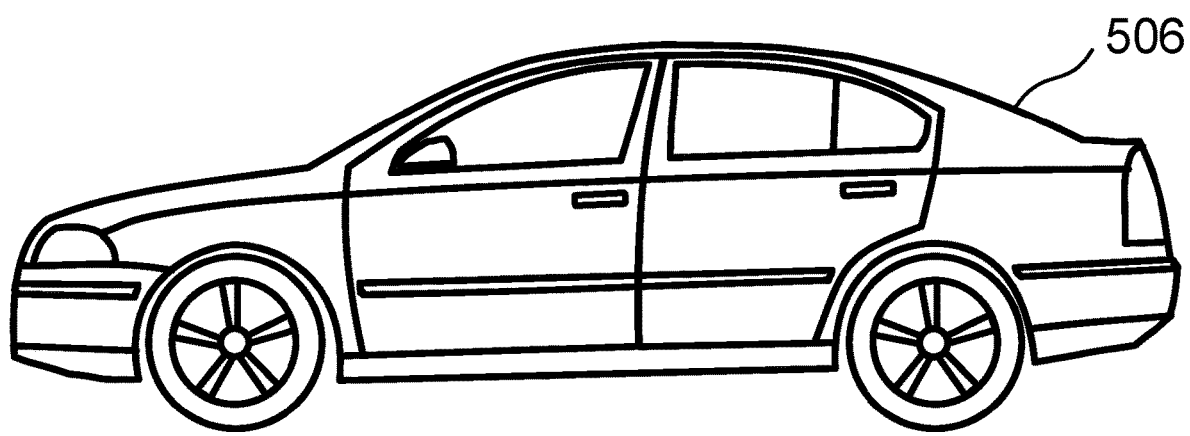

FIG. 5C illustrates an automobile 506. The automobile 506 may be able to connect to the Internet through a wireless network. However, if driven away from an area with a reliable wireless network, the automobile 506 must process utterances, respond, and give appropriate results reliably, using only local processing. As a result, the automobile 506 can run software locally for natural language utterance processing. Though many automobiles have visual displays, to avoid distracting drivers in dangerous ways, the automobile 506 may provide results with speech-only requests and responses or may provide results to a display for only non-driving passengers to view and interact with.

Figure 6:
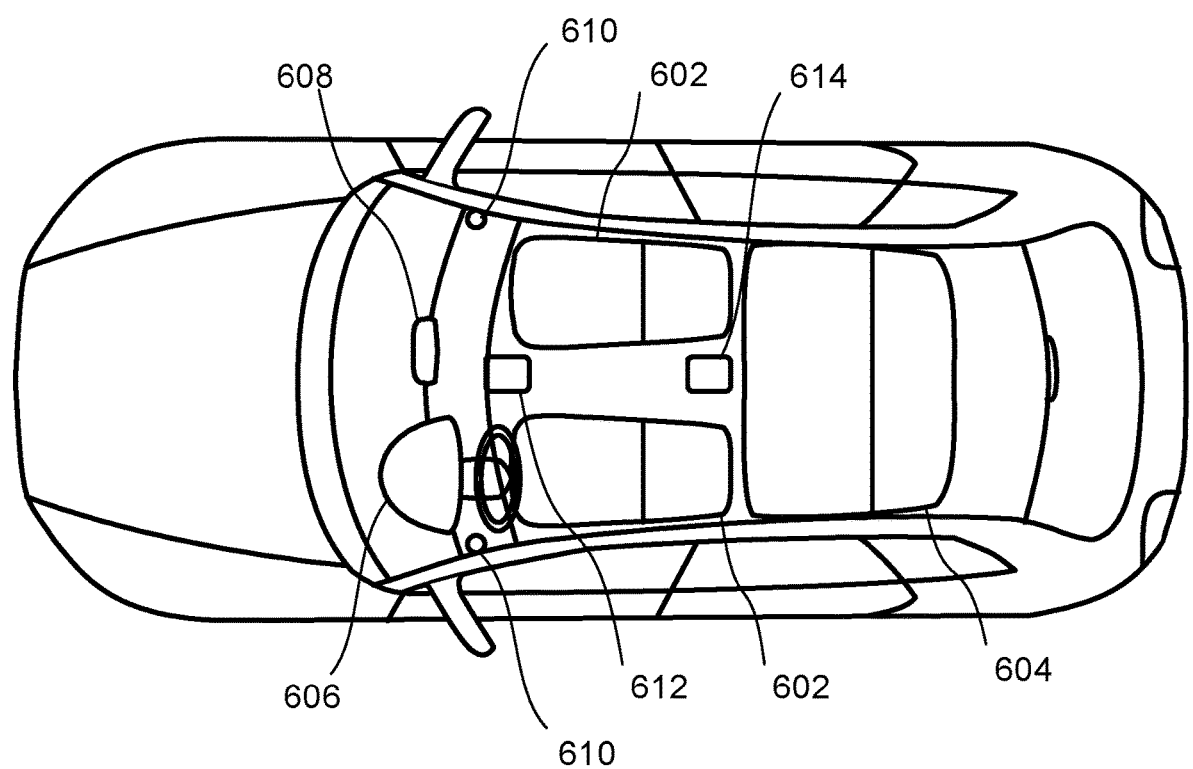
FIG. 6 illustrates shows an overhead view of an automobile designed to implement the technology disclosed.

FIG. 6 shows an overhead view of an automobile 600 designed to implement the technology disclosed. The automobile 600 has two front seats 602, either of which can hold one person. The automobile 600 also has a back seat 604 that can hold several people. The automobile 600 has a driver information console 606 that displays basic information such as speed and energy level. The automobile 600 also has a dashboard console 608 for more complex human interactions that cannot be quickly conducted by speech, such as viewing and tapping locations on navigational maps.

The automobile 600 has side bar microphones 610 and a ceiling-mounted console microphone 612, all of which receive speech audio such that a digital signal processor embedded within the automobile can perform an algorithm to distinguish between speech from the driver or front-seated passenger. The automobile 600 also has a rear ceiling-mounted console microphone 614 that receive speech audio from rear-seated passengers.

The automobile 600 also has a car audio sound system with speakers. The speakers can play music but also produce speech audio for spoken responses to user commands and results. The automobile 600 also has an embedded microprocessor. It runs software stored on non-transitory computer-readable media that instruct the processor to perform some or all of the operations discussed with reference to the algorithm of FIGS. 1-5, 7 and 8, among other functions.

Figure 7:
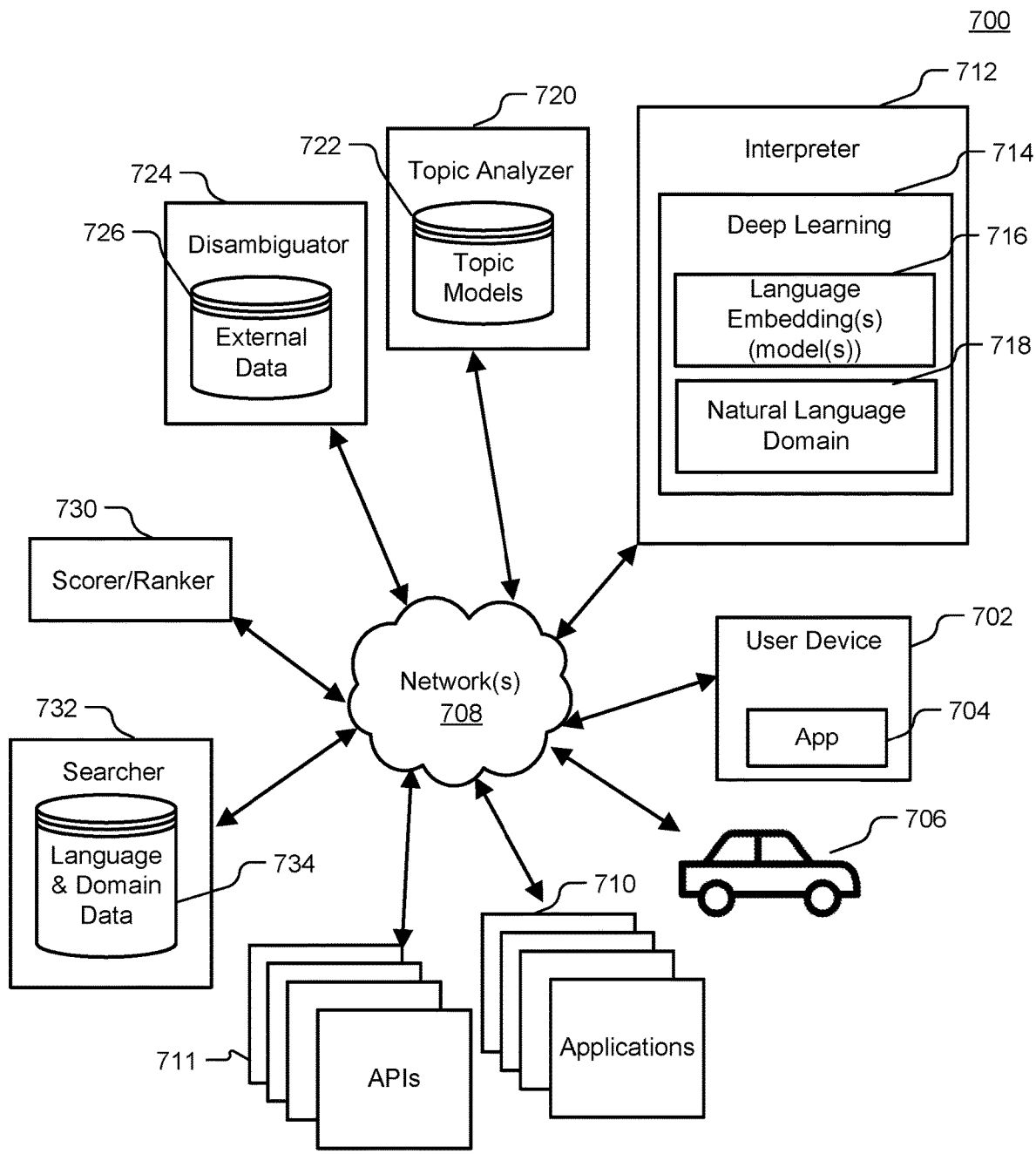
FIG. 7 illustrates an example environment in which personal memos and/or favorites can be stored, search and retrieved for generation of intelligent responses using the technology disclosed.

FIG. 7 illustrates an example environment 700 in which personal memos and/or favorites (or information derived therefrom) can be stored, searched for retrieval and for generation of intelligent responses using the technology disclosed. The environment 700 includes at least one user device 702, 706. The user device 702 can be a mobile phone, tablet, workstation, desktop computer, laptop or any other type of user device running an application 704. The user device 702 can be an automobile 706 or any other combination of hardware and software that is running an application 704.

The user devices 702, 706 are connected to one or more communication networks 708 that allow for communication between various components of the environment 700 and that allow for performing of searches on the internet or other networks. In one implementation, the communication networks 708 include the internet. The communication networks 708 also can utilize dedicated or private communication links that are not necessarily part of the public internet. In one implementation the communication networks 708 use standard communication technologies, protocols, and/or inter-process communication technologies. The user devices 702, 706 are capable of receiving, for example, a first query in a first language, where the purpose of the query is to perform a search on the internet or a private network. The application 704 is implemented on the user devices 702, 706 to capture the first query.

The environment 700 also includes applications 710 that can be preinstalled on the user devices 702, 706 or updated/installed on the user devices 702, 706 over the communications networks 708. Additionally, the environment 700 includes Application Programming Interfaces (APIs) 711 that can also be preinstalled on the user devices 702, 706 or updated/installed on the user devices 702, 706 over the communications networks 708. The APIs 711 can be implemented to allow the user devices 702, 706 and the applications 710 to easily gain access to other components on the environment 700 as well as certain private networks.

The environment 700 also includes an interpreter 712 that can be running on one or more platforms/servers that are part of a speech recognition system. The interpreter 712 can be a single computing device (e.g., a server), a cloud computing device, or it can be any combination of computing device, cloud computing devices, etc., that are capable of communicating with each other to perform the various tasks required to perform meaningful interpretation, as well as speech recognition, if desired. The interpreter 712 can include a deep learning system 714 that is capable of using artificial intelligence, neural networks, and or machine learning to perform interpretations. The deep learning 714 can implement language embedding(s), such as a model or models 716 as well as a natural language domain 718 for providing domain-specific translations and interpretations for natural language processing (NLP).

Since the interpreter 712 can be spread over multiple servers and/or cloud computing device, the operations of the deep learning 714, the language embedding(s) 716 and the natural language domains 718 can also be spread over multiple servers and/or cloud computing device. The applications 710 can be used by and/or in conjunction with the interpreter 712 to translate spoken input, as well as text input and text file input. Again, the various components of the environment 700 can communicate (exchange data) with each other using customized APIs 711 for security and efficiency. The interpreter 712 is capable of interpreting a query or statement (e.g., natural language utterance) obtained from the user devices 702, 706.

The user devices 702, 706 and the interpreter 712 can each include memory for storage of data and software applications, a processor for accessing data in executing applications, and components that facilitate communication over the communications networks 708. The user devices 702, 706 execute applications 704, such as web browsers (e.g., a web browser application 704 executing on the user device 702), to allow developers to prepare and submit applications 710 and allow users to submit speech audio queries (e.g., the speech input 102 and query 103 of FIG. 1) including natural language utterances to be interpreted by the interpreter 712.

As mentioned above, the interpreter 712 can implement one or more language embeddings (models) 716 from a repository of embeddings (models) (not illustrated) that are created and trained using the techniques that are known to a person of ordinary skill in the art.

As also mentioned above, the natural language domain 718 can be implemented by the interpreter 712 in order to add context or real meaning to the transcription of the received speech input.

The environment 700 can further include a topic analyzer 720 that can implement one or more topic models 722 to analyze and determine a topic of a query or statement. Some of the operations of the topic analyzer 720 could be performed during, for example, transcription operation 106 of FIG. 1.

Furthermore, the environment 700 can include a disambiguator 724 that is able to utilize any type of external data 726 (e.g., disambiguation information) in order to add further meaning to an obtained query. Essentially, the disambiguator 724 is able to add further meaning to a query or statement by analyzing previous searches of the user, profile data of the user, location information, calendar information, date and time information, etc. For example, the disambiguator 724 can be used to add synonyms to the initial search that can be helpful to narrow the search to what the user wants to find. The disambiguator 724 can also add additional limits to the search, such as certain dates and/or timeframes (e.g., based on the travel plans of the user additional limits can be added to the original query to identify events that are occurring while the user is traveling to a certain region).

For example, if the query 103 obtained by one of the user devices 702, 706 is "How long do I cook lasagna?" the topic analyzer 720 can analyze the query and determine that the topic (or domain) is "memo.cooking". The disambiguator 724 can use the external data 726 to determine that the user has been cooking at their mother's house for the past few days. Accordingly, the disambiguator 724 can extend the terms of the first query from "How long do I cook lasagna?" to "How long do I cook lasagna at my mother's house?" Prior to extending the query, the system can ask the user if they are cooking at their home or at their mother's house. In other words, the combination of the results obtained by the topic analyzer 720 and the disambiguator 724 can essentially narrow the scope of the query. The disambiguator 724 can also use other mechanisms to extend the keywords of the received queries. This can be done by asking the user broad or specific questions regarding their initial query or can simply be done using artificial intelligence or other means to be able to further narrow the initial query.

Regardless of whether the topic analyzer 720 and/or the disambiguator 724 are implemented to change the scope of any of the queries or statements, a searcher 732 of the environment 700 is implemented to perform a search for a memo or favorite information based on the query to obtain language. The searcher 732 can implement language and domain data 734 to determine which domains should be searched.

The searcher 732 can, for example, identify a domain for a query in dependence upon at least one of a wake phrase, a trigger phrase, the contents or topic of the query, as determined by the topic analyzer 720. The searcher 732 is not limited to searching just a single domain. The searcher 732 can search multiple domains in parallel or in series. For example, if an insufficient number of results are found after searching in the first domain (e.g., the memo domain) a second domain (e.g., favorites) may be searched.

Various scoring techniques can be implemented which will be understood by one of ordinary skill in the art. Further, the user may have the option to select various scoring and ranking techniques to be implemented. For example, the user may select to have scoring and ranking independently implemented (and presented) for each domain. The scorer/ranker 730 may only present the top X results or a top Y percentage of results so as to not overwhelm the user.

Whether the results are presented in speech or text, the technology disclosed can also provide a brief visual or auditory summary of each result, making it easier for the user to determine which results they would like to view first.

The interpreter 712, topic analyzer 720, disambiguator 724, scorer/ranker 730 and/or the searcher 732 can be implemented using at least one hardware component and can also include firmware, or software running on hardware. Software that is combined with hardware to carry out the actions of the interpreter 712, topic analyzer 720, disambiguator 724, scorer/ranker 730 and/or the searcher 732 can be stored on computer readable media such as rotating or non-rotating memory. The non-rotating memory can be volatile or non-volatile. In this application, computer readable media does not include a transitory electromagnetic signal that is not stored in a memory; computer readable media store program instructions for execution. The interpreter 712, topic analyzer 720, disambiguator 724, scorer/ranker 730 and/or the searcher 732, as well as the applications 710, the topic models, 722, external data 726, the language and domain data 734 and the APIs 711 can be wholly or partially hosted and/or executed in the cloud or by other entities connected through the communications network 708.

Figure 8:
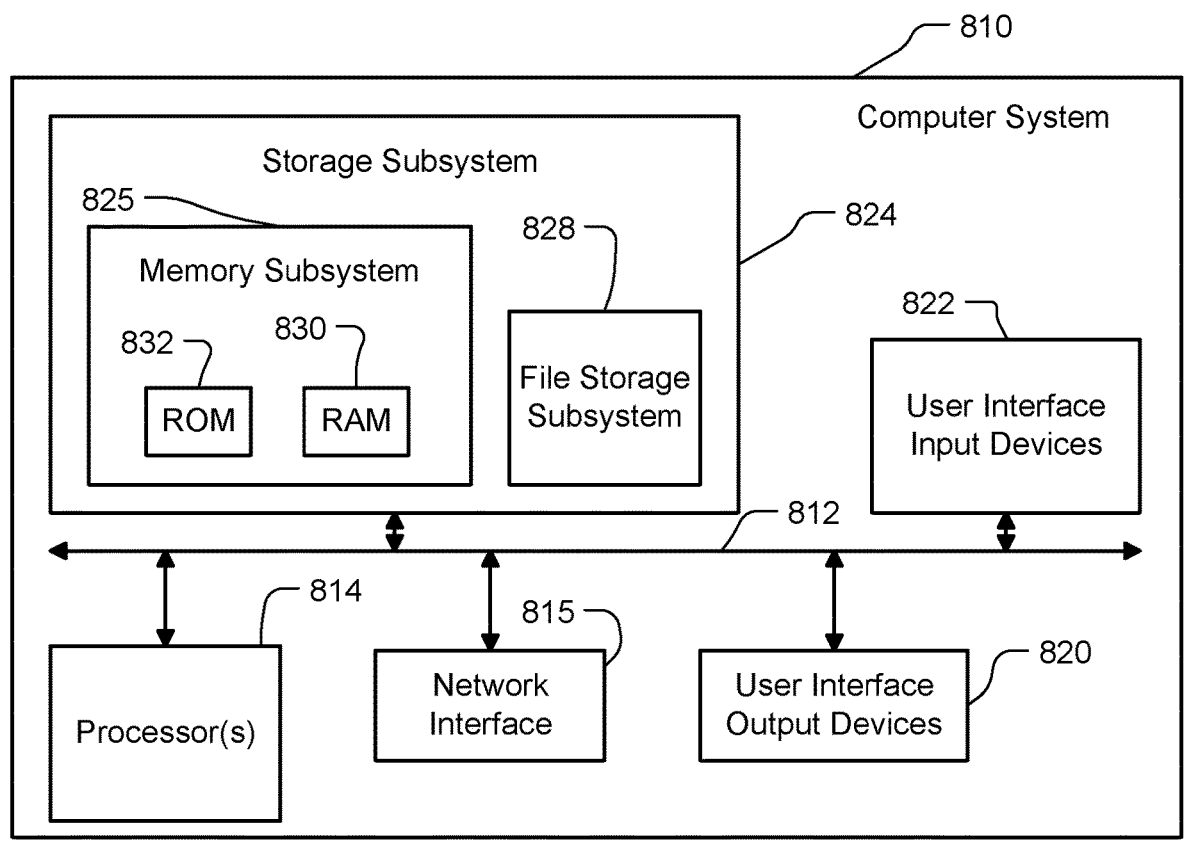
FIG. 8 is a block diagram of an example computer system that can implement various components of the environment of FIG. 7.

FIG. 8 is a block diagram of an example computer system that can implement various components of the environment 700 of FIG. 7. Computer system 810 typically includes at least one processor 814, which communicates with a number of peripheral devices via bus subsystem 812. These peripheral devices may include a storage subsystem 824, comprising for example memory devices and a file storage subsystem, user interface input devices 822, user interface output devices 820, and a network interface 815. The input and output devices allow user interaction with computer system 810. Network interface 815 provides an interface to outside networks, including an interface to the communication networks 708, and is coupled via the communication networks 708 to corresponding interface devices in other computer systems.

User interface input devices 822 may include audio input devices such as speech recognition systems, microphones, and other types of input devices. In general, use of the term "input device" is intended to include all possible types of devices and ways to input speech information into computer system 810 or onto communication network 708.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. These software modules are generally executed by processor 814 alone or in combination with other processors.

Memory subsystem 825 used in the storage subsystem can include a number of memories including a main random-access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 828 in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative embodiments of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating the various embodiments. Many other configurations of computer system 810 are possible having more or fewer components than the computer system depicted in FIG. 8.

Some Particular Implementations

We describe various implementations of retrieving a personal memo from a database and storing a memo in a database.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation of the technology disclosed includes a method of retrieving a personal memo from a database. The method includes receiving, by a virtual assistant, a natural language utterance that expresses a request, interpreting the natural language utterance according to a natural language grammar rule for retrieving memo data from the natural language utterance, the natural language grammar rule recognizing query information, responsive to interpreting the natural language utterance, using the query information to query the database for a memo related to the query information, and providing, to a user, a response generated in dependence upon the memo related to the query information.

According to an implementation, the natural language grammar rule for retrieving memo data is selected from a plurality of domain dependent grammar rules in accordance to contents of the received natural language utterance.

In another implementation, the database is queried for the memo related to the query information by searching the database to identify any memo that includes information sufficient to provide an appropriate response to the user.

In an implementation the response is provided to the user, such that the response answers the request expressed by the natural language utterance as opposed to providing a word-for-word repeat of a transcription.

A further implementation includes identifying a trigger phrase from the received natural language utterance, and responsive to identifying the trigger, selecting the natural language grammar rule for retrieving memo data in dependence upon at least one of (i) the identified trigger phrase and (ii) other contents of the natural language utterance.

In an implementation the trigger phrase includes both a personal pronoun followed by an interrogative pronoun or a relative pronoun that is within 5 words of the personal pronoun.

In a different implementation the method can include receiving an indication that the user spoke a memo-specific wake phrase before the natural language utterance.

In a further implementation the database storing the memo is a structured database, such that the memo is stored in a structured format, and in another implementation the database storing the memo is an unstructured database, such that the memo is stored in an unstructured format.

In one implementation the method includes receiving, from the user, a natural language utterance including memo information, interpreting the natural language utterance to extract the memo information, and storing the memo information in the database as a memo.

Another implementation includes the stored interpretation of the natural language utterance including the memo information includes personal information about the user.

Moreover, an implementation can include receiving, interpreting and storing multiple natural language utterances including the memo information as memos that relate to a subject along with additional information indicating a time-order of being received, and generating the response in dependence upon a stored memo (i) relating to the subject and (ii) that was interpreted from a most recently received natural language utterance including the memo information relating to the subject.

Another implementation may include replacing other previously stored memos that relate to a subject with a most recently stored memo that relates to the subject when multiple natural language utterances including the memo information are received, interpreted and stored in the database as a memo that relates to a subject.

According to one implementation, the method includes allowing the user to confirm or acknowledge whether or not the user intended for the natural language utterance including the memo information to be stored as the memo.

According to a further implementation, the method includes deleting the stored memo related to the natural language utterance including the memo information when the user indicates that that natural language utterance including the memo information was not intended to be stored as the memo.

According to another implementation, the method includes assigning a time period to the memo, after which the memo will expire, and removing the memo from the database when the time period has expired.

An implementation may also include interpreting the natural language utterance that expresses the request according to multiple domains, each domain of the multiple domains having an associated relevancy score for the interpreted utterance, wherein a memo domain is one of the multiple domains, and wherein the memo domain has a score advantage relative to other domains.

Additionally, according to one implementation the method may include storing a recording of the natural language utterance that expresses the request and/or storing a recording the natural language utterance including the memo information.

According to an implementation a first particular interpretation of the transcription of text is stored in the database in association with a first domain and a second particular interpretation of the transcription is stored in the database in association with the second domain, such that two or more interpretations stored in the database.

One implementation may include storing meta-data along with the memo, where the meta-data include information such as short-term activity information, daily weather information, until-event occurs information, and where the meta-data can be explicitly stated by the user or inferred from other information including other memos, regular commute information and/or calendar information.

Other implementations may include a non-transitory computer-readable recording medium having a computer program for retrieving a personal memo form a database recorded thereon. The computer program, when executed on one or more processors, causes the processors to perform the method described above and any of the above-described implementations. Specifically, includes receiving, by a virtual assistant, a natural language utterance that expresses a request, interpreting the natural language utterance according to a natural language grammar rule for retrieving memo data from the natural language utterance, the natural language grammar rule recognizing query information, responsive to interpreting the natural language utterance, using the query information to query the database for a memo related to the query information, and providing, to a user, a response generated in dependence upon the memo related to the query information.

Each of the features discussed in this particular implementation section for the first system implementation apply equally to the CRM implementation. As indicated above, all the system features are not repeated here and should be considered repeated by reference.

A system implementation of the technology disclosed includes one or more processors coupled to memory. The memory is loaded with computer instructions to retrieve a personal memo from a database. The instructions, when executed on the one or more processors, implement actions including includes receiving, by a virtual assistant, a natural language utterance that expresses a request, interpreting the natural language utterance according to a natural language grammar rule for retrieving memo data from the natural language utterance, the natural language grammar rule recognizing query information, responsive to interpreting the natural language utterance, using the query information to query the database for a memo related to the query information, and providing, to a user, a response generated in dependence upon the memo related to the query information.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

A given event or value is "responsive" (e.g., "in response to" or "responsive to") to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" (e.g. "in dependence upon" or "in dependence on") of a given event or value upon another event or value is defined similarly.

We claim as follows:

1. A method of retrieving a personal memo from a database, the method comprising:
   receiving, from a user, multiple natural language utterances, each including language to trigger storage of memos and each including memo information;
   interpreting the received natural language utterances to extract the memo information;
   storing, in the database, the memo information as memos that relate to a subject and that have time information associated therewith;
   receiving, by a virtual assistant, a natural language utterance that expresses a request;
   interpreting the natural language utterance according to a natural language grammar rule for retrieving a memo using the natural language utterance, the natural language grammar rule recognizing query information;
   responsive to interpreting the natural language utterance, using the query information to query the database for memos related to the query information and related to the subject;
   identifying multiple memos in response to the database query, the identified memos being related to the subject and having the time information associated therewith;
   identifying a memo, from the multiple identified memos, that has been most recently stored according to the time information associated with the multiple memos; and
   providing, to the user, a response generated in dependence upon the identified memo related to the subject and having been most recently stored.

2. The method of claim 1, wherein the natural language grammar rule for retrieving the memo is selected from a plurality of domain dependent grammar rules in accordance to contents of the received natural language utterance.

3. The method of claim 1, wherein the database is queried for the memo related to the query information by searching the database to identify any memo that includes information sufficient to provide an appropriate response to the user.

4. The method of claim 1, wherein the response is provided to the user, such that the response answers the request expressed by the natural language utterance as opposed to providing a word-for-word repeat of a transcription.

5. The method of claim 1, further comprising receiving an indication that the user spoke a memo-specific wake phrase before the natural language utterance.

6. The method of claim 1, wherein the database storing the memo is a structured database, such that the memo is stored in a structured format.

7. The method of claim 1, wherein the database storing the memo is an unstructured database, such that the memo is stored in an unstructured format.

8. The method of claim 1, wherein at least one stored memo of the stored memos includes personal information about the user.

9. The method of claim 1, further comprising:
   replacing other previously stored memos that relate to a subject with a most recently stored memo that relates to the subject when multiple natural language utterances including the memo information are received, interpreted and stored in the database as a memo that relates to a subject.

10. The method of claim 1, further comprising:
    assigning a time period to at least one of the stored memos, after which the at least one memo will expire; and
    removing the at least one memo from the database when the time period has expired.

11. The method of claim 1, wherein the memo indicates that a specific entity is the user's favorite.

12. The method of claim 1, further comprising:
    identifying a trigger phrase from the received natural language utterance; and
    responsive to identifying the trigger phrase, selecting the natural language grammar rule for retrieving the memo in dependence upon the identified trigger phrase.

13. The method of claim 12, wherein the trigger phrase includes both a personal pronoun followed by an interrogative pronoun or a relative pronoun that is within 5 words of the personal pronoun.

14. The method of claim 1, further comprising allowing the user to confirm or acknowledge whether or not the user intended for at least one of the natural language utterances including the memo information to be stored as a memo.

15. The method of claim 14, further comprising deleting the stored memo related to the at least one of the natural language utterances including the memo information when the user indicates that that natural language utterance including the memo information was not intended to be stored as the memo.

16. A non-transitory computer-readable recording medium having a computer program for retrieving a personal memo from a database recorded thereon, the computer program, when executed on one or more processors, causing the processors to perform a method comprising:
    receiving, from a user, multiple natural language utterances, each including language to trigger storage of memos and each including memo information;
    interpreting the received natural language utterances to extract the memo information;
    storing, in the database, the memo information as memos that relate to a subject and that have time information associated therewith;
    receiving, by a virtual assistant, a natural language utterance that expresses a request;
    interpreting the natural language utterance according to a natural language grammar rule for retrieving a memo using the natural language utterance, the natural language grammar rule recognizing query information;
    responsive to interpreting the natural language utterance, using the query information to query the database for memos related to the query information and related to the subject;
    identifying multiple memos in response to the database query, the identified memos being related to the subject and having the time information associated therewith;
    identifying a memo, from the multiple identified memos, that has been most recently stored according to the time information associated with the multiple memos; and
    providing, to the user, a response generated in dependence upon the identified memo related to the subject and having been most recently stored.

17. The non-transitory computer-readable recording medium of claim 16, wherein the natural language grammar rule for retrieving the memo is selected from a plurality of domain dependent grammar rules in accordance to contents of the received natural language utterance.

18. The non-transitory computer-readable recording medium of claim 16, wherein the database is queried for the memo related to the query information by searching the database to identify any memo that includes information sufficient to provide an appropriate response to the user.

19. The non-transitory computer-readable recording medium of claim 16, wherein the response is provided to the user, such that the response answers the request expressed by the natural language utterance as opposed to providing a word-for-word repeat of a transcription.

20. The non-transitory computer-readable recording medium of claim 16, wherein the method further comprises receiving an indication that the user spoke a memo-specific wake phrase before the natural language utterance.

21. The non-transitory computer-readable recording medium of claim 16, wherein the database storing the memo is a structured database, such that the memo is stored in a structured format.

22. The non-transitory computer-readable recording medium of claim 16, wherein the database storing the memo is an unstructured database, such that the memo is stored in an unstructured format.

23. The non-transitory computer-readable recording medium of claim 16, wherein at least one stored memo of the stored memos includes personal information about the user.

24. The non-transitory computer-readable recording medium of claim 16, wherein the method further comprises:
replacing other previously stored memos that relate to a subject with a most recently stored memo that relates to the subject when multiple natural language utterances including the memo information are received, interpreted and stored in the database as a memo that relates to a subject.

25. The non-transitory computer-readable recording medium of claim 16, wherein the method further comprises:
assigning a time period to at least one of the stored memos, after which the at least one memo will expire; and
removing the at least one memo from the database when the time period has expired.

26. The non-transitory computer-readable recording medium of claim 16, wherein the memo indicates that a specific entity is the user's favorite.

27. The non-transitory computer-readable recording medium of claim 16, wherein the method further comprises:
identifying a trigger phrase from the received natural language utterance; and
responsive to identifying the trigger phrase, selecting the natural language grammar rule for retrieving the memo in dependence upon the identified trigger phrase.

28. The non-transitory computer-readable recording medium of claim 27, wherein the trigger phrase includes both a personal pronoun followed by an interrogative pronoun or a relative pronoun that is within 5 words of the personal pronoun.

29. The non-transitory computer-readable recording medium of claim 16, wherein the method further comprises allowing the user to confirm or acknowledge whether or not the user intended for at least one of the natural language utterances including the memo information to be stored as a memo.

30. The non-transitory computer-readable recording medium of claim 29, wherein the method further comprises deleting the stored memo related to the at least one of the natural language utterances including the memo information when the user indicates that that natural language utterance including the memo information was not intended to be stored as the memo.

31. A system including one or more processors coupled to memory, the memory loaded with computer instructions to retrieve a personal memo from a database, the instructions, when executed on the one or more processors, implement actions comprising:
receiving, from a user, multiple natural language utterances, each including language to trigger storage of memos and each including memo information;
interpreting the received natural language utterances to extract the memo information;
storing, in the database, the memo information as memos that relate to a subject and that have time information associated therewith;
receiving, by a virtual assistant, a natural language utterance that expresses a request;
interpreting the natural language utterance according to a natural language grammar rule for retrieving a memo using the natural language utterance, the natural language grammar rule recognizing query information;
responsive to interpreting the natural language utterance, using the query information to query the database for memos related to the query information and related to the subject; and
identifying multiple memos in response to the database query, the identified memos being related to the subject and having the time information associated therewith;
identifying a memo, from the multiple identified memos, that has been most recently stored according to the time information associated with the multiple memos; and
providing, to the user, a response generated in dependence upon the identified memo related to the subject and having been most recently stored.

32. The system of claim 31, wherein the natural language grammar rule for retrieving the memo is selected from a plurality of domain dependent grammar rules in accordance to contents of the received natural language utterance.

33. The system of claim 31, wherein the database is queried for the memo related to the query information by searching the database to identify any memo that includes information sufficient to provide an appropriate response to the user.

34. The system of claim 31, wherein the response is provided to the user, such that the response answers the request expressed by the natural language utterance as opposed to providing a word-for-word repeat of a transcription.

35. The system of claim 31, wherein the actions further comprise receiving an indication that the user spoke a memo-specific wake phrase before the natural language utterance.

36. The system of claim 31, wherein the database storing the memo is a structured database, such that the memo is stored in a structured format.

37. The system of claim 31, wherein the database storing the memo is an unstructured database, such that the memo is stored in an unstructured format.

38. The system of claim 31, wherein at least one stored memo of the stored memos includes personal information about the user.

39. The system of claim 31, wherein the actions further comprise:
replacing other previously stored memos that relate to a subject with a most recently stored memo that relates to the subject when multiple natural language utterances including the memo information are received, interpreted and stored in the database as a memo that relates to a subject.

40. The system of claim 31, wherein the actions further comprise:
assigning a time period to at least one of the stored memos, after which the at least one memo will expire; and
removing the at least one memo from the database when the time period has expired.

41. The system of claim 31, wherein the memo indicates that a specific entity is the user's favorite.

42. The system of claim 31, wherein the actions further comprise:
identifying a trigger phrase from the received natural language utterance; and
responsive to identifying the trigger phrase, selecting the natural language grammar rule for retrieving the memo in dependence upon the identified trigger phrase.

43. The system of claim 42, wherein the trigger phrase includes both a personal pronoun followed by an interrogative pronoun or a relative pronoun that is within 5 words of the personal pronoun.

44. The system of claim 31, wherein the actions further comprise allowing the user to confirm or acknowledge whether or not the user intended for at least one of the natural language utterances including the memo information to be stored as a memo.

45. The system of claim 44, wherein the actions further comprise deleting the stored memo related to the at least one of the natural language utterances including the memo information when the user indicates that that natural language utterance including the memo information was not intended to be stored as the memo.

* * * * *